(12) United States Patent
Lundgren et al.

(10) Patent No.: US 6,243,260 B1
(45) Date of Patent: Jun. 5, 2001

(54) RETRACTABLE SPEAKERS FOR PORTABLE COMPUTER

(75) Inventors: Anthony K. Lundgren, Sioux City, IA (US); Richard W. Griencewic, McCook Lake, SD (US)

(73) Assignee: Gateway, Inc., North Sioux, SD (US)

( * ) Notice: Subject to any disclaimer, the term of this patent is extended or adjusted under 35 U.S.C. 154(b) by 0 days.

(21) Appl. No.: 09/178,955

(22) Filed: Oct. 27, 1998

Related U.S. Application Data

(62) Division of application No. 08/700,790, filed on Aug. 21, 1996, now Pat. No. 5,838,537.

(51) Int. Cl.⁷ .................................................. G06F 1/16
(52) U.S. Cl. .......................... 361/683; 381/87; 381/88; 381/309; 381/386; 381/395
(58) Field of Search ................................. 381/87, 88, 309, 381/386, 395

(56) References Cited

U.S. PATENT DOCUMENTS

| | | | |
|---|---|---|---|
| 5,287,245 | 2/1994 | Lucente et al. | 361/680 |
| 5,481,616 | 1/1996 | Freadman | 381/90 |
| 5,675,426 | * 10/1997 | Meisner et al. | 358/838 |
| 5,825,614 | * 10/1998 | Kim | 361/863 |

OTHER PUBLICATIONS

IBM Technical Disclosure Bulletin, vol. 38, No. 11, pp-121–122, Nov. 1995, "Speaker Enclosure Design for Notebook Computer".*

* cited by examiner

*Primary Examiner*—Leo P. Picard
*Assistant Examiner*—Yean-Hsi Chang
(74) *Attorney, Agent, or Firm*—Schwegman, Lundberg, Woessner & Kluth, P.A.; Kenneth Cool

(57) ABSTRACT

Retractable speakers for use in a housing coupled to a computer, such as a portable computer or docking bar, which allow for sound quality optimization by being positionally adjustable relative to the computer housing. Retractable speaker locations relative to the computer housing include the top surface, side surfaces or front surface. Speakers are rotatable about a hinge relative to the housing surface, or emerge from the surface, such that the speaker is rotatable about an axis in order to direct the sound output toward a user. Alternatively, speakers disengage from the computer housing for placement on a surface in an optimum sound quality arrangement. Retracted speakers are substantially internal to the computer housing allowing for ease of transport and use in remote locations.

28 Claims, 8 Drawing Sheets

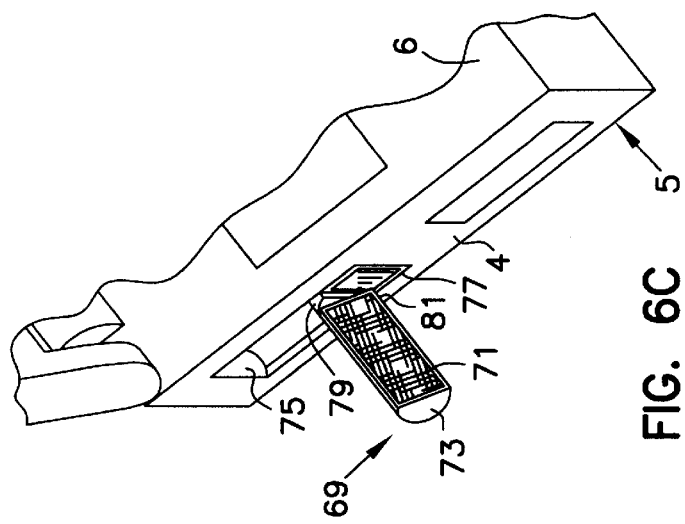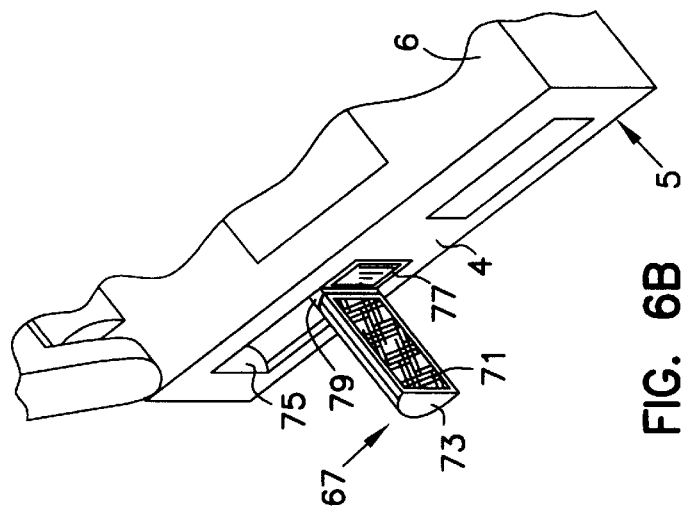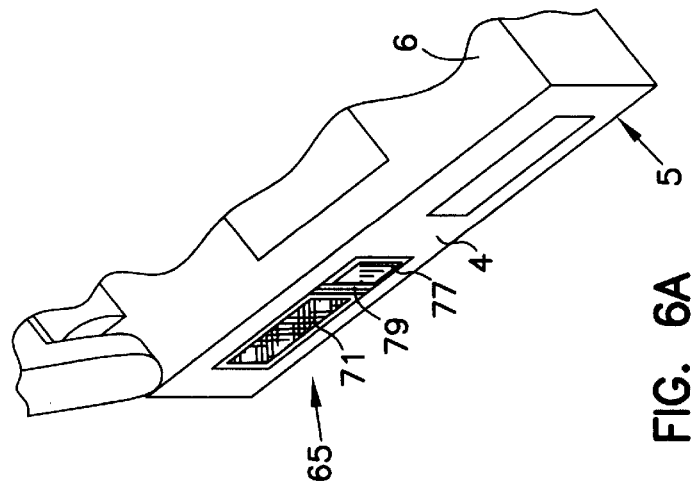

RETRACTABLE SPEAKERS FOR PORTABLE COMPUTER

This appln is a Divisional Ser. No. 08/700,790 filed Aug. 21, 1996. U.S. Pat. No. 5,838,537.

FIELD OF THE INVENTION

The present invention relates generally to sound systems for portable computers, and in particular to speakers that extend from a portable computer housing for orientation toward the user.

BACKGROUND OF THE INVENTION

The present invention relates to sound systems for portable computers (PCs). Basic PCs have traditionally not included sound systems of any kind, except for simple system and error message tones. Higher end portable's have either included sound systems as standard equipment, or have offered them as options to the basic system. With the increasing availability, lower cost, portable multimedia systems, the need for better sound in such systems has become increasingly important.

Speakers for a sound system can either be external or internal to a portable computer. The external systems are usually offered as add-ons to existing PCs that did not include an internal system from the factory. In some cases, internal retro-fit systems may be available for certain PCs. An external system will usually include a PCMCIA type sound driver card coupled to external speakers. A CD-ROM drive may also be added-on to complete the multi-media system. In a few instances, the CD-ROM drive includes the sound driver hardware, or a SCSI-type adapter card, which then connects to the external CD-ROM. It is possible to use a software driver in conjunction with a sound hardware card to create sounds using the basic internal speaker on a PC (the speaker primarily provided to output message or error tones). However, the quality of these sounds will usually be quite poor compared with the potential quality available using a pair of external speakers, or even a pair of internal speakers when provided as part of the original PC package. External speakers range in quality from poor to very high, depending on the manufacturer and cost.

In most cases, a computer user is interested in creating a reasonably good sound system for use with the computer, but depending on the type of usage, quality of sound output could be quite critical. A child playing games may need only minimal quality to enjoy the sound effects of a particular software application. However, a music composer running composition software may need the highest quality of sound output possible from a computer system. A physically challenged individual using a computer as a vocal substitute may require much higher quality of sound output. One of the key factors to sound output quality from external speakers is the ability of the computer user to direct the sound output by adjustment of the speakers' location, rotation or inclination. The user will usually locate and orient the speakers so as to direct the sound toward the user to gain maximum clarity and effect.

When a PC is provided with an internal sound system, it usually includes a pair of speakers located within the housing of the PC. Due to the space constraints within the PC, the level of quality of the speakers themselves is often limited by their size. In addition, the overall quality of the sound system using these speakers is affected by the location of the speakers within the housing. Initially, when internal sound systems were first introduced for portable computers, the speakers were located within the main housing, adjacent to the keyboard, and oriented so that the sound projected upwards from the surface of the PC. Since the user's ears are not normally located over the surface of the PC and oriented down towards the surface, much of the sound produced by these speakers is lost, thus reducing the quality of the sound output.

Currently, a number of other speaker locations have been provided by PC manufacturers, in addition to the original housing location and surface orientation. It is quite common now to have the speakers mounted in the display housing of the PC, towards the top edge and oriented outwards, so that the sound is projected toward the user. This location and orientation increases the likelihood of the sound reaching the ears of the user, thus increasing the quality of the sound output, but is still limited by the physical constraints of display orientation. In fact, many times a user might want someone else to hear the sound better, such as an audience, or to direct the sound toward the ceiling or some other structure to take better advantage of acoustic properties of the physical environment where the system is located. Depending on the type of display provided on the PC, i.e. liquid crystal display, plasma, field effect display and other types of displays, the orientation of the display housing of the PC can also have a huge effect on the quality of picture. Therefore, with the speakers located on the display housing, adjustment of the sound output is in direct competition with adjustment of the visual output, and the user must choose which output to optimize at the expense of the other. It also has become increasingly common to find the speakers located at the hinge region of the PC housing. Since the speakers are fixed in position, their orientation is limited to the orientation of the display.

It is also possible to create an improved sound system for a portable computer by including a pair of speakers in a docking station or port replicator type unit. These units allow the user to "plug in" the PC to the docking station to which a full size external display, keyboard, and pointing device can be connected. In addition, a CD-ROM drive, additional hard disk storage, floppy drives, or internal cards can sometimes be added to the docking station. Although larger and possibly better quality speakers can be included as part of the docking station, the overall sound system quality of the PC will not be enhanced because the docking station is seldom transported with the PC; its intended purpose is usually to create a more comfortable operator environment at a home or office and does not affect the PC when it is being transported somewhere else. Even though larger speakers are included in the docking station oriented toward the user, their rotation and inclination are not adjustable.

What is needed is a portable computer with a sound system that is adjustable by the user. What is also needed is a portable computer with a sound system including speakers which are positionally adjustable by the user. What is further needed is a portable computer with an adjustable sound system including speakers that are internal to the computer for ease of transport and use at remote locations. There is a further need for a sound system in a portable computer with enhanced sound.

SUMMARY OF THE INVENTION

Retractable speakers are provided in a portable computer in order to optimize sound output quality. The retractable speakers are substantially internal to the computer housing in the retracted position. They emerge from the housing to an extended position, and in one embodiment are rotatable to adjust the projected sound output of the speaker towards a user.

The retractable speakers are locatable on the top, side or front surfaces of a portable computer, as well as on any other housing coupled to a computer, such as a docking device. In one embodiment, a speaker rotates about a hinge relative to the surface of the housing until it is directed at the user. In another embodiment, a speaker emerges from the surface to a pre-determined position. Once in this extended position, the speaker rotates to direct the sound projection in an optimal manner. In still another embodiment, the speaker disengages from the computer housing for placement on a surface in a manner that optimally directs the sound output toward the user.

The present invention provides retractable speakers for use with a portable computer which are positionally adjustable by a user to provide optimized sound. In addition, the retractable speakers are substantially internal to the computer housing in the retracted position making the speakers easily transportable and usable in remote locations. Some embodiments of the invention utilize the volume of the housing from which they extend as a resonance chamber to further enhance the sound output they provide. In at least one embodiment, larger size speakers than are currently useable are provided, thus increasing the power and quality of the sound system output.

BRIEF DESCRIPTION OF THE DRAWINGS

FIG. 6a is a partial perspective view of a portable computer showing a side-mount speaker in the retracted position;

FIG. 6b is a partial perspective view of a portable computer showing a side-mount speaker in the extended position;

FIG. 6c is a partial perspective view of a portable computer showing a side-mount speaker in the extended and rotated position;

DETAILED DESCRIPTION

In the following detailed description of the embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
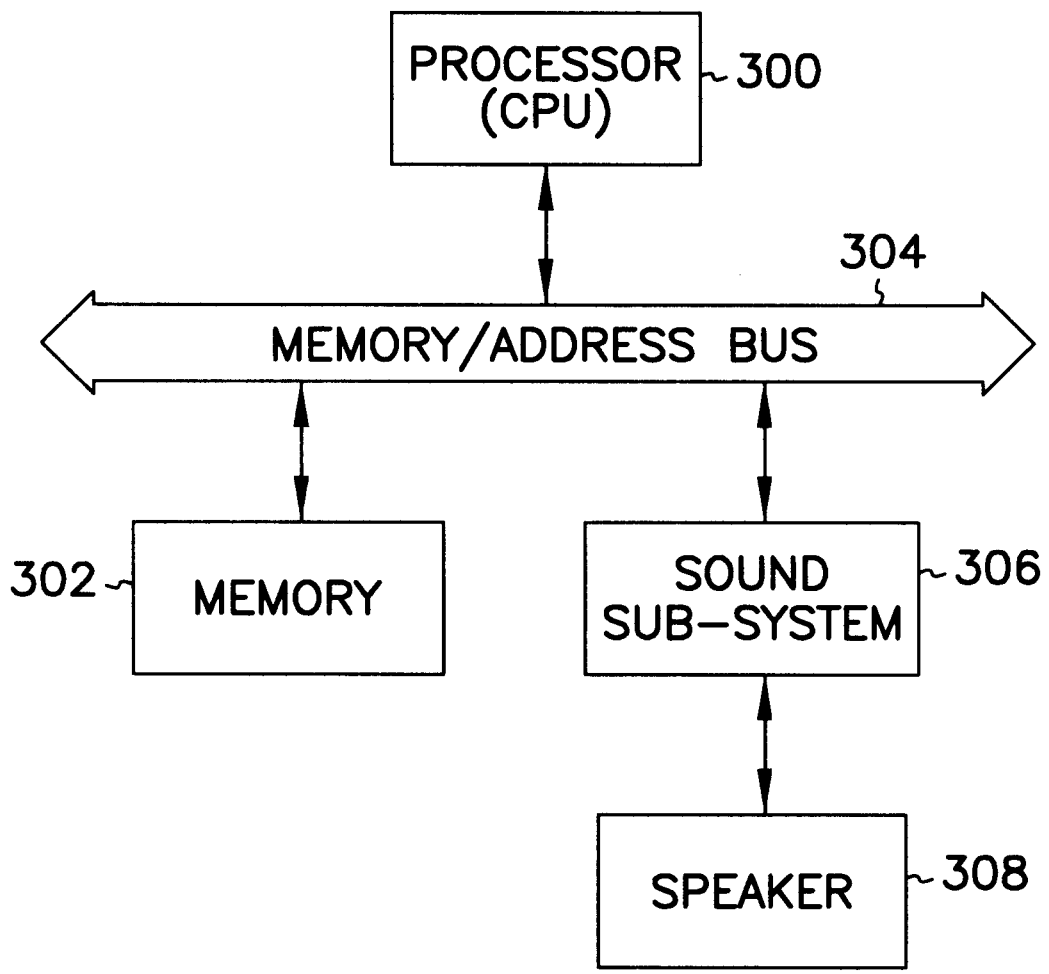
FIG. 1 is a flow block diagram representation of a computer with a sound system.

Referring now to the drawings, FIG. 1 is a representational block diagram of a basic computer with sound capability comprising a processor 300 (CPU), memory 302 coupled to the processor 300 via a bus 304, and a sound sub-system 306 also coupled to the processor 300 via the bus 304. Bus 304 is shown in very simple form, and actually represents a host bus, PCI bus and ISA bus as well as other buses which are well known in the art. Computers contain these and many other components in numerous different combinations in order to meet the end user's functionality requirements. The minimum componentry required to define a computer is well known in the art. A portable computer contains any or all of the same components as a basic computer, however, these components are packaged into a housing that is small in size and weight and allows transportation and use in almost any environment.

The sound sub-system 306 is as basic as a single speaker 308 controlled off the bus 304, or as expansive as multiple stereo speakers with independent sub-woofers controlled by a sound driver card added to a slot in the card rack of the computer. Although the basic speaker system is usually used only for error and messaging tones, it is programmable to emit tone sequences, i.e. music or verbal messages, through software. For most common multi-media computer configurations, a sound driver card and a pair of reasonable quality speakers are normally used.

Figure 2:
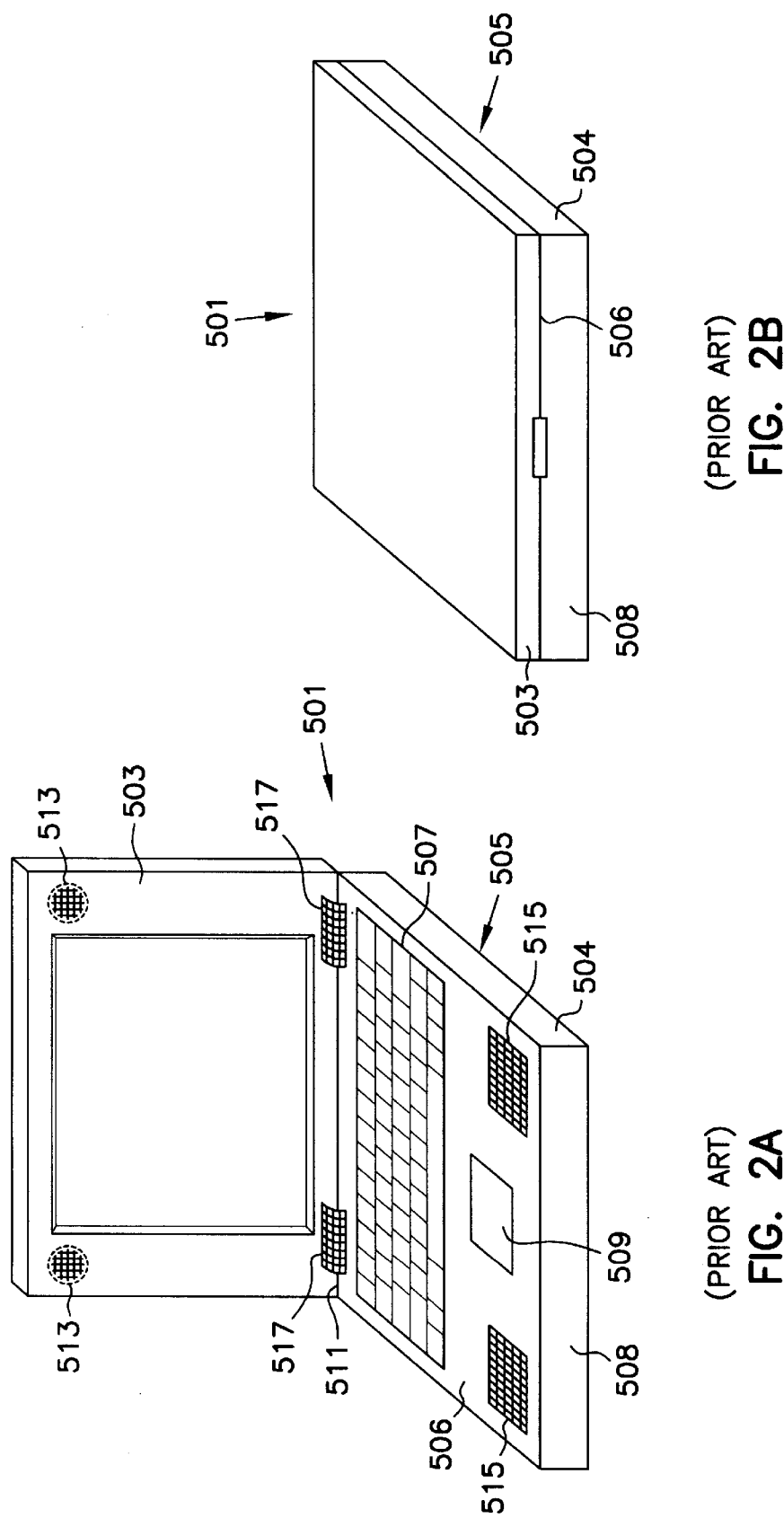
FIG. 2a is an perspective view of a basic portable computer showing prior art speaker locations.
FIG. 2b is an perspective view of a basic portable computer in the closed position.

FIG. 2a shows a generic portable computer configuration 501 in the open position. A system housing 505 couples to a display housing 503 with a hinged coupling 511. The housing 505 includes, among other components, a keyboard 507 and some type of pointing device 509. Often included, but not shown, are a floppy drive, a hard disk drive, some version of a PCMCIA slot, an external power input port, and a battery. In addition, the housing 505 usually includes a top surface 506, where the keyboard 507 and pointing device 509 reside, at least one side surface 504, and a front surface 508.

The closed position of a basic portable computer is shown in FIG. 2b. In this position, the display housing 503 is substantially parallel and adjacent to the top surface 506 of the housing 505. The portable computer 501 usually provides a locking or latching mechanism to keep the display housing 503 from rotating away from the housing top surface 506 during transport.

Referring back to FIG. 2a, the most common locations of internal speakers currently available for portable computers are shown. Speakers are locatable on the housing top surface 515, however in this location the sound projects straight up and not toward the user. They are locatable on the display housing 513 so as to improve the sound output by directing the sound more closely toward the user, however this location causes a conflict between visual display optimization and sound quality optimization. Displays and monitors are also being designed thinner, making it difficult to use large speakers. Speakers are also locatable at the display hinges 517. Speakers in this location help improve the directional attributes without causing a conflict between the visual and audio output, however these speakers, as well as all the other current speakers regardless of location, lack the positional adjustability required for users to obtain desired accoustic characteristics.

Figure 3:
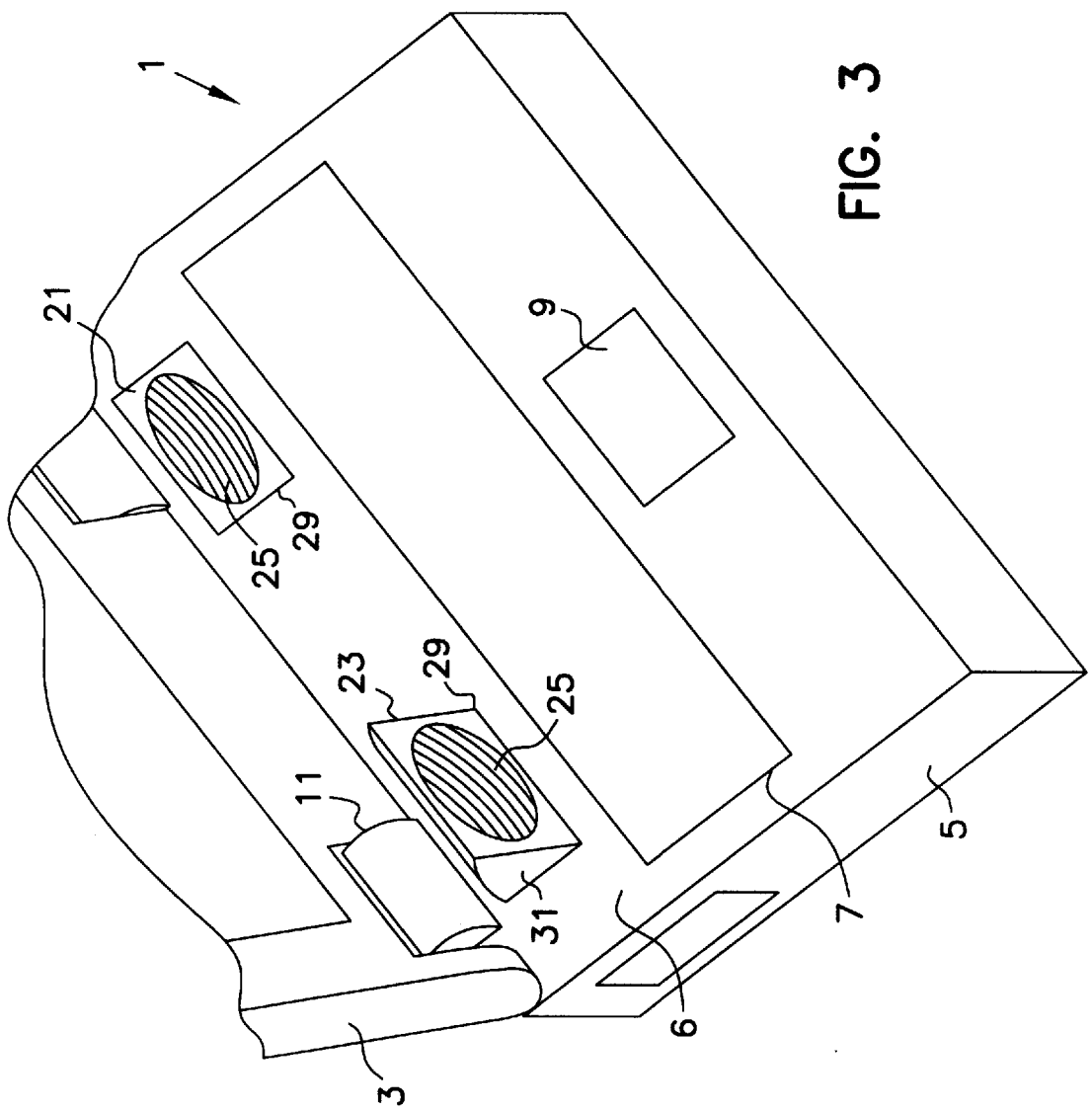
FIG. 3 is a partial perspective view of a portable computer showing surface hinged speakers.

FIG. 3 illustrates one of the embodiments of the present invention which overcomes the problems with the prior art. A portable computer 1 with a display housing 3 coupled to a housing 5 by a hinge 11 is shown with a keyboard 7 and a pointing device 9. On the top surface of the housing 6, two sound producing devices in the form of retractable speakers 21, 23 reside between the keyboard 7 and the display hinge 11. Both speakers 21, 23 include a grill 25 over, and a casing 31 around, the speaker for protection and appearance. One of the speakers 21 is in a retracted position and is substantially flush with the top surface of the housing 6. The other speaker 23 is in an extended position. The speaker 23 is adjustable to protrude from the top surface 6 rotating about a hinge 29 until it reaches a desired position. The user thus has the option of projecting sound in different directions. Since there is a desire to make housing 5 smaller and lighter to enhance portability, a smaller speaker may be used if desired. The ability to project the sound from the smaller speaker in a desired direction helps compensate for the reduction in size of the speaker.

Figure 4A:
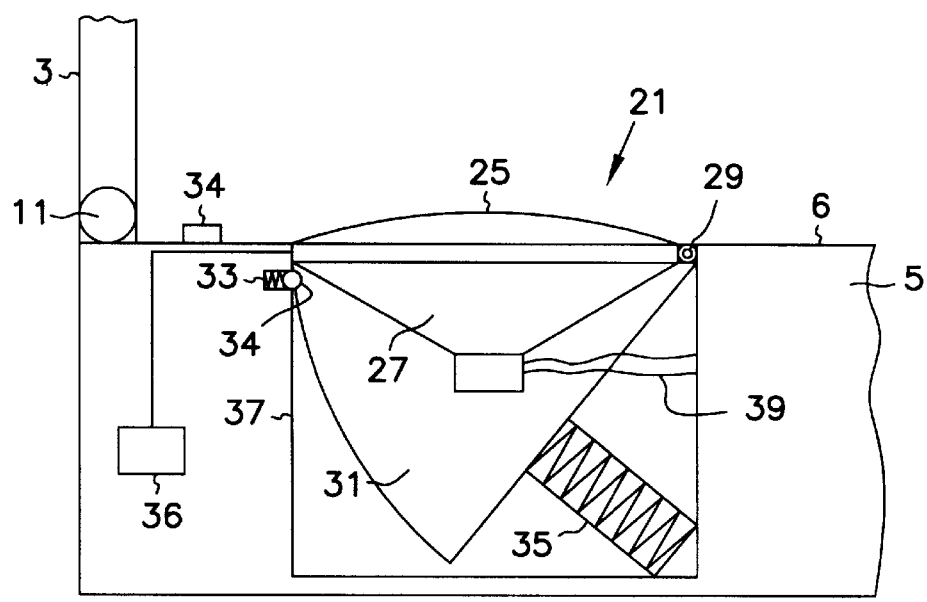
FIG. 4a is a partial side view of a surface hinged speaker in the retracted position.
Figure 4B:
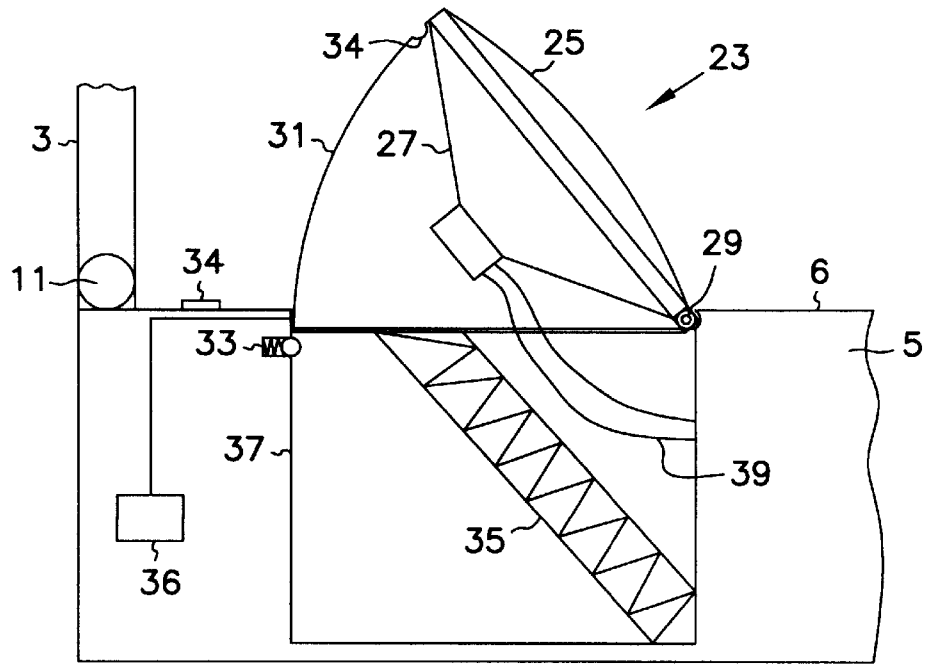
FIG. 4b is a partial side view of a surface hinged speaker in the elevated position.

FIGS. 4a and 4b illustrate further detail of operation of the surface hinged speakers 21, 23 also shown in FIG. 3. In FIG. 4a, the speaker 21 is in the retracted position, and in FIG. 5, the speaker 23 is in the extended position. In both figures, the speakers comprise a speaker cone 27, housed in a casing 31 and covered by a grill 25, which resides in an inset 37 within the computer housing 5. The speaker casing 31 is hinged to the housing 5 by a hinged coupling 29 allowing rotation from the flush position to the extended position 23. The speaker cone 27 couples to the computer by a speaker control connection 39, usually wires. When the speaker 21 is in the retracted position flush with the top surface of the housing 6, a spring loaded latch or release mechanism 33 in the housing 5 mates with a corresponding detent 34 in the speaker casing 31 to hold it in place against a force mechanism 35 which tends to push the speaker cone 27 and casing 31 into the extended position 23. Upon activation of the release mechanism 33, the speaker casing 31 emerges from the inset 37 powered by the force mechanism 35, rotating about the hinged coupling 29 until it reaches a desired position in which the speaker cone 27 projects toward the user. When in the extended position 23, the inset 37 acts as an additional resonance chamber, providing further enhancement of the sound provided.

In a further embodiment, the force mechanism 35 is very weak such that release from the latching mechanism allows the speaker to be displaced sufficiently from the top surface of housing 6 to allow a user to further move the speaker. In this embodiment, the hinged coupling 29 or the edges of the housing pressing against the casing 31 provide sufficient friction to keep the speaker in any position as manually set by the user. In yet a farther embodiment, the casing 31 provides finger holds to allow a user to move the speaker without the need for a force mechanism 35.

Release mechanism 33 activation is possible in a number of different ways. When the portable computer 1 opens, and the display housing 3 rotates about the display hinge 11, a force applied to the surface hinge speaker 21 releases allowing the speaker to emerge and rotate into the extended position 23. Alternatively, the release mechanism 33 activates manually, by operation of an external switch 34 coupled to the release mechanism 33, or by a momentary downward force applied to the speaker grill 25 which, in turn, activates an internal spring switch (not shown). In addition, automatic activation of the release mechanism 33 is possible. A signal from the computer, which is generated, for example, by a software application or by a function key, trips an internal switch which, in turn, activates the internal spring switch (not shown).

Once the speaker 23 is in the extended position, many methods are possible to return it to the flush position 21. Automatic return requires an additional mechanism (not shown) for retracting the speaker 23 back in to the housing inset 37. Manual return requires a user to apply a force to the speaker grill 25 pushing the speaker 23 back down into the housing inset 37 where the release mechanism 33 re-engages. Alternatively, rotation of the display housing 3 back into the closed position applies a force to the speaker casing 31 resulting in retraction of the speaker 21 into the housing 5.

Figure 5A:
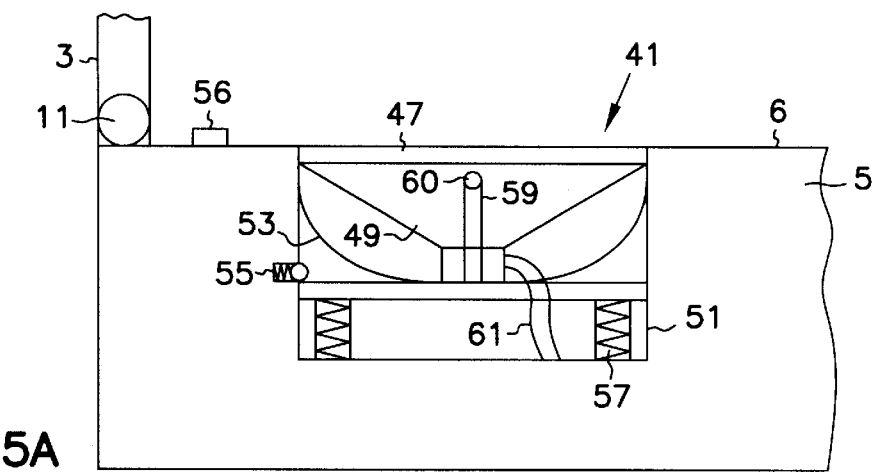
FIG. 5a is a side view of a surface pop-up speaker in the retracted position.
Figure 5B:
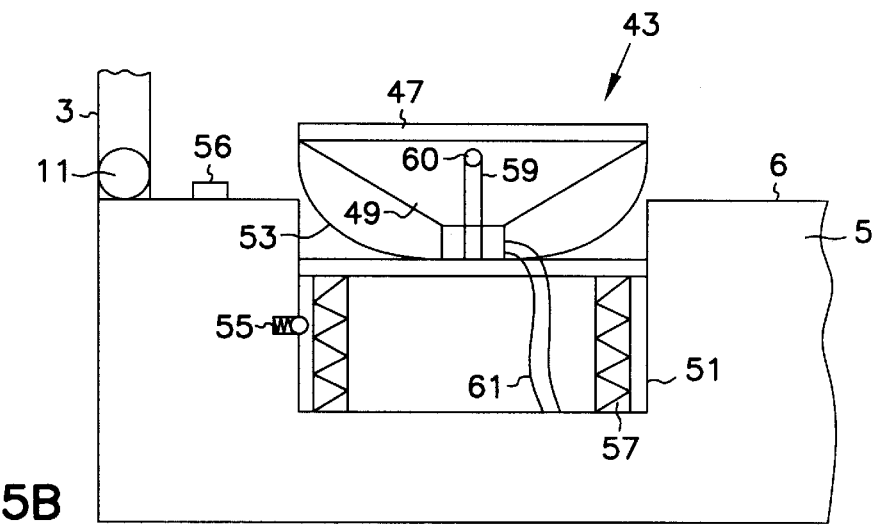
FIG. 5b is a side view of a surface pop-up speaker in the elevated position.
Figure 5C:
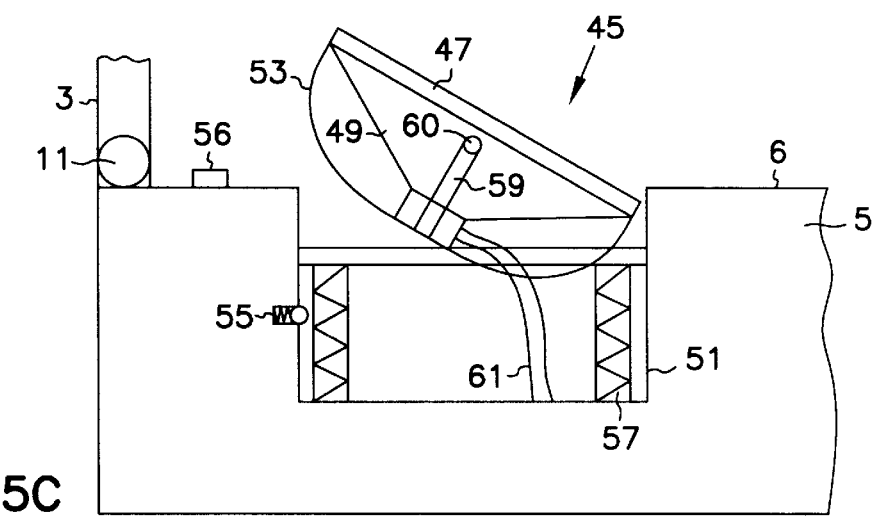
FIG. 5c is a side view of a surface pop-up speaker in the elevated and rotated position.

In FIGS. 5a–5c, another embodiment of the present invention is depicted. In FIG. 5a, a surface pop-up speaker is shown in the flush position 41 relative to the computer housing top surface 6. In FIG. 5b, the surface pop-up speaker is in an extended position 43 relative to the top surface 6, and in FIG. 5c, the speaker is in an extended and rotated position 45 relative to the top surface 6. In this embodiment, the speaker also comprises a speaker cone 49, enclosed in a casing 53 and covered by a grill 47, which resides in an inset 51 within the computer housing 5. The speaker casing 53 cradles in a rotation mechanism 59 allowing rotation of the casing 53 about an axis 60. The speaker cone 49 couples to the computer by a speaker control connection 61. When the speaker 41 is in the retracted position flush with the top surface of the housing 6, a release mechanism 55 holds it in place against a force mechanism 57 which tends to push the speaker cone 49 and casing 53 into the extended position 43. Upon activation of the release mechanism 55, the speaker casing 53 emerges from the inset 51 powered by the force mechanism 57 until it reaches a desired position with respect to the housing top surface 6. The speaker casing 53 is then rotatable about the axis 60 of the rotation mechanism 59 until the speaker cone 49 projects toward the user, optimizing the sound quality.

In this embodiment, as in the previous embodiment, many methods of activation of the release mechanism 55 are possible, including the opening of the portable computer 1 and rotation of the display housing 3 about the display hinge 11 releasing a downward force on the speaker 41, or by a momentary downward force on the speaker grill 47 which activates an internal switch, or by manual engagement of an external switch 56 coupled to the release mechanism 55, or automatically through software or hardware. Return of the speaker 43 to the flush position 41 also occurs in many ways, such as automatically, manually, or by closing of the display housing 3. In addition, rotation of the speaker casing 53 about the axis 60 of the rotation mechanism 59 occurs either automatically, requiring an electrically powered rotation device, or manually, requiring power input by a user.

FIGS. 6a–6c depict another embodiment of the present invention. A side mounted speaker 65 is shown flush with a side surface 4 of the computer housing 5 in FIG. 6a. FIG. 6b shows this speaker in the extended position 67, and FIG. 6c shows this speaker in the extended and rotated position 69.

This embodiment involves a combination of the same elements as the previous embodiments, except in a side surface 4 mounting instead of a top surface 6 mounting.

In the three figures, the speakers comprise a speaker cone, not shown, housed in a casing 73 and covered by a grill 71, which resides in an inset 75 within the computer housing 5. The speaker casing 73 is hinged to the housing 5 by a hinged coupling 79 allowing rotation from the flush position 65 to the extended position 67. The speaker casing 73 attaches to a rotation mechanism 81 allowing rotation of the casing 73 about an axis, not shown. When the speaker 65 is in the retracted position flush with the side surface of the housing 4, a release mechanism, not shown, holds it in place against a force mechanism, not shown, which tends to push the speaker casing 73 into the extended position 67. Upon activation of the release mechanism, the speaker casing 73 emerges from the inset 75 powered by the force mechanism or manually with appropriate finger holds where there is no force mechanism, rotating about the hinged coupling 79 until it reaches a desired position with respect to the side surface 4 of the housing 5. The speaker casing 73 is then rotatable within the rotation mechanism 81 until the speaker 69 projects toward the user, providing a user optimized sound quality.

In this embodiment, as in the previous embodiment, activation of the release mechanism occurs in many ways, including a momentary inward force on the speaker grill 71, or by manual engagement of an external switch 77 coupled to the release mechanism, or automatically. Return of the speaker 67 to the flush position 65 also occurs either automatically or manually. In addition, rotation of the speaker casing 73 about the rotation mechanism 81 either automatically or manually.

In all of the previous embodiments, the speakers operate either in the extended or retracted positions, giving greater versatility to the use of the sound system. In some circumstances, use of extended speakers may not be advisable or feasible.

Figure 8A:
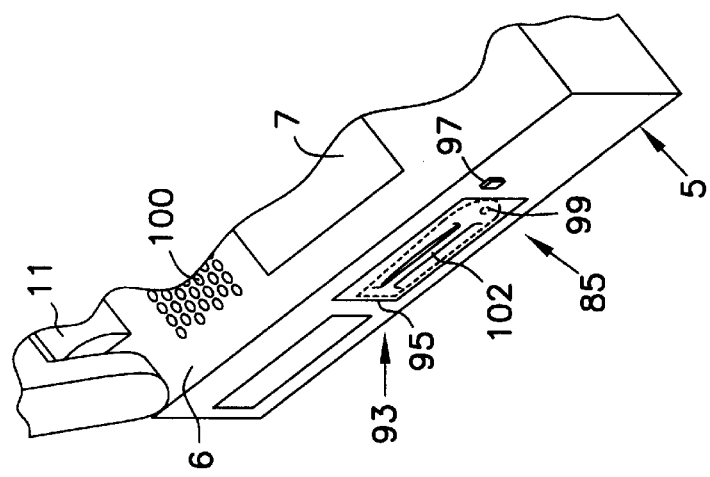
FIG. 8a is a partial perspective view of a portable computer showing a side drawer speaker in the retracted position.
Figure 8B:
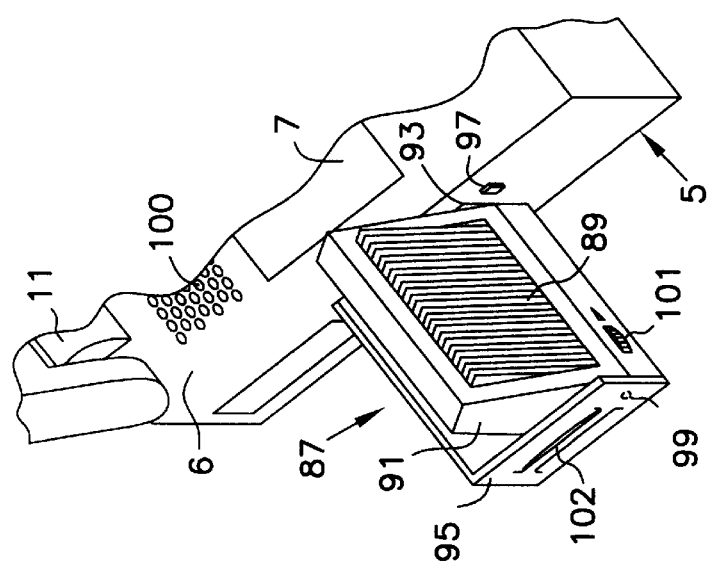
FIG. 8b is a partial perspective view of a portable computer showing a side drawer speaker in the extended and rotated position.

In another embodiment of the present invention, shown in FIGS. 8a and 8b, a speaker 85, 87 is housed in a drawer-type enclosure 95 which extends and retracts from the side surface 4 of the computer housing 5. This embodiment comprises similar components as the previous embodiment, including a speaker grill 89 over a speaker cone, not shown, enclosed in a speaker casing 91 which resides in an inset 93 within the side of the computer housing 5 when in the retracted position. The speaker casing 91 attaches to a rotation mechanism 99 within the drawer-type enclosure 95 allowing rotation about an axis, not shown. In addition, this embodiment also comprises a drawer-type enclosure 95 encasing the speaker casing 91 which extends from and retracts into the housing of the computer 5. This drawer-type enclosure 95 is rectilinear, profiled to the shape of the speaker casing 91, or some other suitable shape.

This drawer-type enclosure 95 is locatable beneath the keyboard section 7 of the computer housing 5, or between the keyboard section 7 and the display hinge 11. When located in the latter position, the retracted speaker 87 is operable while still retracted, when perforations 100 on the top surface 6 of the housing 5 which may include the keyboard section 7 are formed to allow projection of the sound outside of the housing 5. This variation of the embodiment allows use of the sound system when extension of the speakers is not possible.

As in the previous embodiment, when the speaker 87 is in the retracted position flush with the side surface of the housing 5, a release mechanism, not shown, holds it in place against a force mechanism, not shown, which tends to push the speaker casing 91, within the drawer-type enclosure 95, into the extended position. Upon activation of the release mechanism, the drawer-type enclosure 95 emerges from the inset 93 powered by the force mechanism until it reaches a pre-determined position or desired position with respect to the side surface 4 of the housing 5. The speaker casing 91 is then rotatable within the rotation mechanism 99 until the speaker casing 91 projects toward the user, optimizing the sound quality.

The release mechanism of this embodiment is activatable in numerous ways, such as automatically and manually. Manual activation includes engagement of an external switch 97 coupled to the release mechanism, or a momentary inward force on the external surface of the drawer-type enclosure 95, or by an outward force applied to the drawer-type enclosure 95 centered at an inset handle 102 included on the external surface of the enclosure 95. In the latter situations the manual outward force replaces the force mechanism. Return of the speaker 87 to the retracted position 85 and rotation of the speaker casing 91 about the rotation mechanism 99 also occurs either manually or automatically.

As shown in FIG. 8b, this speaker 87, as well as any other embodiment of the present invention, either described or conceivable by one skilled in the art, contains a volume control mechanism 101. This volume control mechanism 110 is locatable for use only in the extended position, or for use in either the retracted or extended positions.

Figure 10:
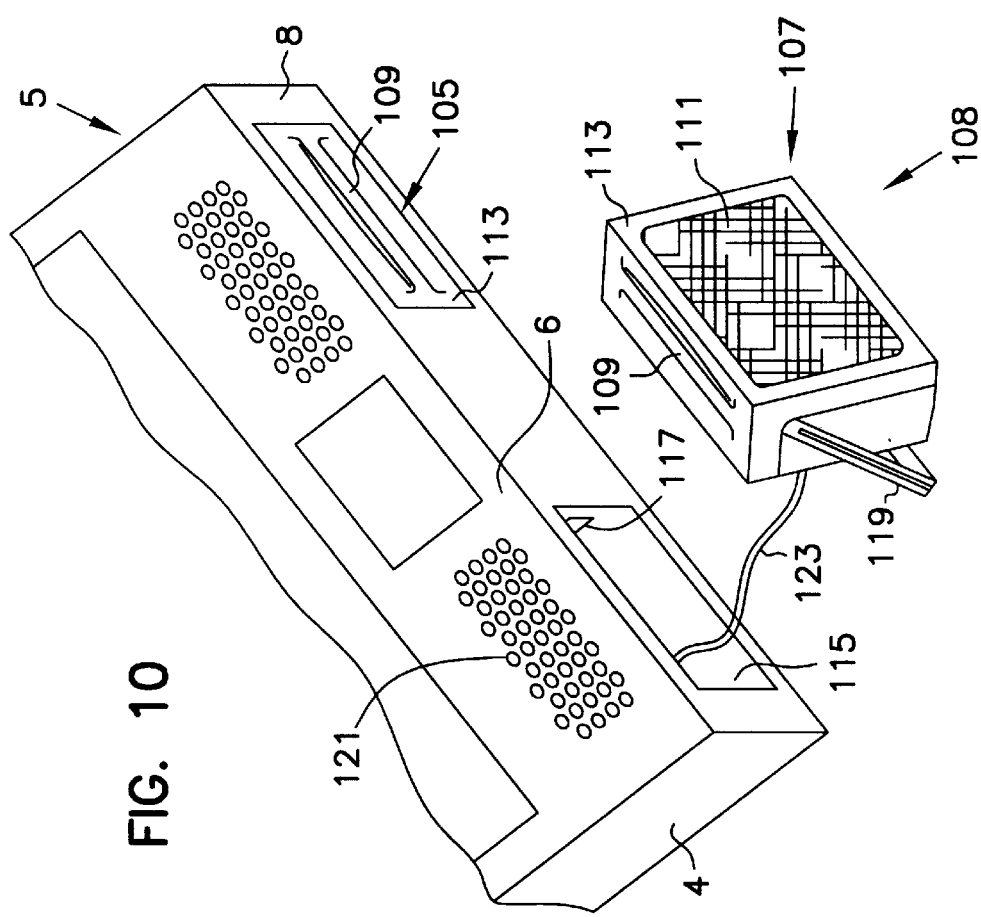
FIG. 10 is a partial perspective view of a portable computer showing front drawer speakers both in the retracted and in the disengaged positions.

FIG. 10 illustrates another embodiment of the present invention. The same drawer-type speakers described in the previous embodiment are installable on the front surface 8 of the computer housing 5, as shown by a retracted drawer-type speaker 105. In addition, the drawer-type speakers 107 are disengagable from the housing 5, either front 8 or side 4 surfaces, for placement on a surface 108 in a manner which optimizes the sound quality.

The disengagable speaker 107 comprises similar components as the other embodiments described so far. A speaker cone, not shown, is enclosed in a speaker casing 113 and covered by a grill 111. The speaker 107 resides in an inset 115 within the housing 5 when retracted. The speaker cone couples to the computer by a speaker control connection 123, which uses wires or is wireless. The housing top surface 6 contains perforations allowing sound projection from the retracted speakers 105. The external surface of the speaker 105, 107 also includes an inset handle 109. The disengagable speakers 105, 107 also include a release mechanism and force mechanism, not shown.

In addition to these common components, the disengagable speaker 107 also comprises a rotation mechanism 119 which serves as a support stand when placing the speaker 107 on a surface 108. This stand 119 rotates to optimize sound quality from this speaker embodiment. This rotation mechanism/stand 119 also serves as a guide which mates to a corresponding internal guide 117 within the inset 115 for ease of re-engagement of the speaker 107.

As in the previous embodiments, activation of the release mechanism, retraction of the speaker, and rotation about the rotation mechanism are automatic, manual, or both. In addition, specific to this embodiment, the disengagement and re-engagement of the speaker 107 are also automatic, manual, or both.

Figure 7:
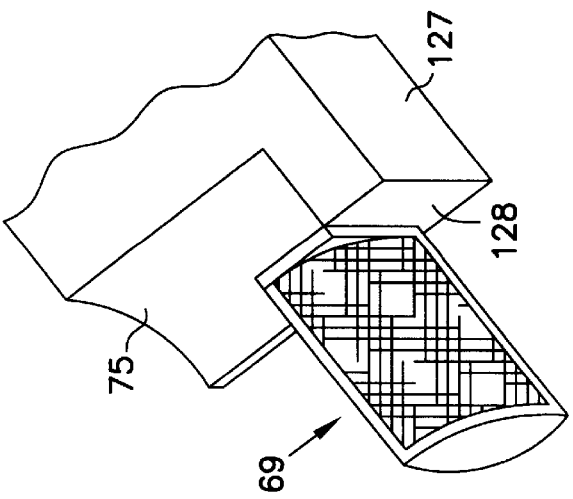
FIG. 7 is a partial perspective view of a portable computer docking bar showing a side-mount speaker in the extended and rotated position.
Figure 9:
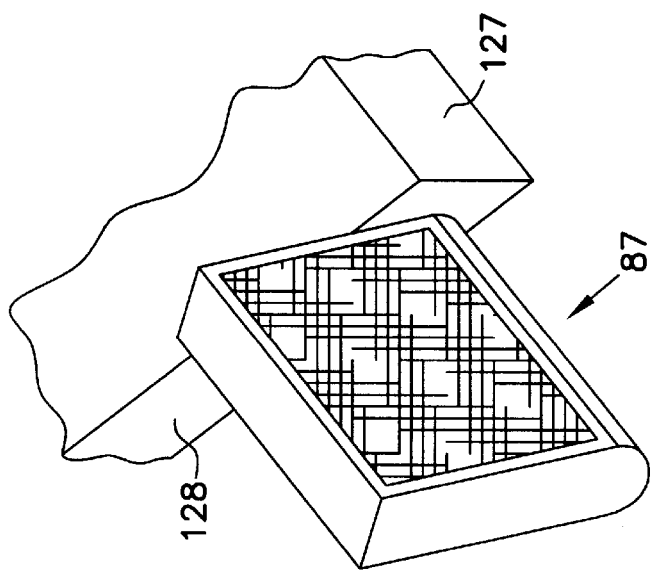
FIG. 9 is a partial perspective view of a portable computer docking bar showing a side speaker in the extended and rotated position.

In addition to a portable computer, the present invention is usable in conjunction with any other housing coupled to a computer, such as a docking bar, docking station, or port replicator. FIGS. 7 and 9 illustrate these embodiments. FIG. 7 shows a side mount speaker 69 in the extended and rotated position with respect to a side surface 128 of a docking bar 127. This embodiment is the same as that previously described, and illustrated in FIGS. 6a–6c. FIG. 9 shows a side drawer speaker 87 in the extended and rotated position with respect to a side surface 128 of a docking bar 127. This embodiment is the same as that previously described, and illustrated in FIGS. 8a & 8b. Any of the embodiments previously described, or conceivable by one skilled in the art, are adaptable to this type of housing.

As can be seen from the above descriptions, the advantages of the present invention are apparent. The multiple embodiments described resolve the problems of location and positional adjustability encountered with prior art portable computer speakers. The present invention allows for sound quality optimization of a sound system within a portable computer by providing speakers that are retractable within a computer housing, yet adjustable for maximum quality output. When extended from the housing, the remaining cavity in the housing provides an additional resonance chamber to further enhance the sound provided. The retractable speakers accommodate portability by being internal in the retracted position, and not requiring external speakers that would need to be carried along with the computer. They also accommodate optimization of sound quality by being positionally adjustable for any type or size of computer user or audience, in any situation. In addition, many of the embodiments of the present invention would allow for use different sizes of speakers depending on the amount of volume available in the system. Smaller speakers may be used and their reduced sound output compensated for by their adjustability. Larger speakers than currently used are possible, due to the ability to place them in the system where there is room, and then adjust them when extended to provide optimum sound.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A portable computer comprising:
   a housing having a plurality of surfaces that protect at least a processor and system bus within the housing; and
   a retractable sound producing device having at least two positions, a first position substantially within the housing in a speaker cavity, and a second position being at least partially exterior to the housing to project sound in a desired direction without having to move the housing, movement between the first position and the second position defined by a first path; and
   a rotatable coupling device adapted for rotating the sound producing device about a first axis of rotation in the second position, the first axis of rotation defining a second path wherein the second path is different than the first path.

2. The portable computer as recited in claim 1, further comprising a force mechanism coupled within the cavity of the housing that moves the sound producing device from the first to the second position.

3. The portable computer as recited in claim 1, further comprising a latching mechanism for retentively maintaining the sound producing device in the first position.

4. The portable computer as recited in claim 1, further comprising a hinge coupled to one edge of the sound producing device and one of the surfaces of the housing for allowing the sound producing device to rotate about the hinge between the first and second positions.

5. The portable computer as recited in claim 1, further comprising a slidable drawer for holding the sound producing device and allowing movement of the sound producing device between the first and second positions.

6. The portable computer as recited in claim 5, wherein the sound producing device comprises a speaker which is removable from the drawer when the speaker is in the second position.

7. The portable computer as recited in claim 5, wherein the slidable drawer further comprises a handle mounted on an exterior surface of the slidable drawer such that an outward pulling force applied at the handle moves the slidable drawer between the first and second positions.

8. The portable computer as recited in claim 5, wherein the sound producing device is attached to the slidable drawer by a rotatable coupling device, the rotatable coupling device adapted to allow rotation of the sound producing device about a first axis of rotation when the sound producing device is disposed in the second position.

9. The portable computer as recited in claim 1, wherein an area of the surface of the housing located immediately above the retracted sound producing device is perforated to convey sound from the sound producing device in the first position to the outside of the housing.

10. The portable computer as recited in claim 1 wherein the second position is at least partially exterior to the housing to adjustably orient the sound producing device toward a user of the computer during use of the sound producing device.

11. The portable computer as recited in claim 1 wherein the second position is at least partially exterior to the housing to allow a user to orient the sound producing device toward the user.

12. A portable computer comprising:
   a housing having a plurality of surfaces which protect at least a processor encompassed therein, the housing including a speaker cavity;
   a retractable sound producing device having at least two positions, a first position substantially within the speaker cavity of the housing and a second position at least partially exterior to the housing; and
   a slidable drawer which receives the retractable sound producing device therein.

13. The portable computer as recited in claim 12, wherein the slidable drawer extends and retracts from a side surface of the housing.

14. The portable computer as recited in claim 12, the computer further comprising a keyboard, wherein the drawer is disposed under the keyboard.

15. The portable computer as recited in claim 12, further comprising a force mechanism coupled with the drawer which moves the sound producing device from the first position to the second position.

16. The portable computer as recited in claim 15, further comprising a coupling device which allows rotation of the sound producing device about a first axis of rotation when the sound producing device is disposed in the second position.

17. The portable computer as recited in claim 16, further comprising a latching mechanism for retentively maintaining the sound producing device in the first position.

18. The portable computer as recited in claim 12, wherein the sound producing device comprises a speaker which is removable from the drawer when the sound producing device is in the second position.

19. The portable computer as recited in claim 12, wherein the sound producing device is attached to the slidable drawer by a rotatable coupling device, the rotatable coupling device adapted to allow rotation of the sound producing device about a first axis of rotation when the sound producing device is disposed in the second position.

20. A portable computer comprising:

a housing having a plurality of surfaces that protect at least a processor and system bus within the housing;

a retractable sound producing device having at least two positions, a first position substantially within the housing in a speaker cavity, and a second position being at least partially exterior to the housing to project sound in a desired direction without having to move the housing;

a rotatable coupling device adapted for rotating the sound producing device about a first axis of rotation in the second position;

a slidable drawer for holding the sound producing device, the sound producing device moveable between the first position and the second position; and wherein the sound producing device is attached to the slidable drawer by a rotatable coupling device, the rotatable coupling device adapted to allow rotation of the sound producing device about a first axis of rotation when the sound producing device is disposed in the second position.

21. The portable computer as recited in claim 20, further comprising a force mechanism coupled within the cavity of the housing that moves the sound producing device from the first position to the second position.

22. The portable computer as recited in claim 20 further comprising a latching mechanism for retentively maintaining the sound producing device in the first position.

23. The portable computer as recited in claim 20 wherein the sound producing device comprises a speaker which is removable from the slidable drawer when the sound producing device is in the second position.

24. The portable computer as recited in claim 20, wherein the slidable drawer further comprises a handle mounted on the exterior surface of the slidable drawer such that an outward pulling force applied at the handle moves the slidable drawer between the first and second positions.

25. The portable sound producing device as recited in claim 20, wherein an area of the surface of the housing located immediately above the retracted sound producing device is perforated to convey sound from the sound producing device in the first position to the outside of the housing.

26. The portable computer as recited in claim 20, wherein the slidable drawer is adapted to extend and retract from a side surface of the housing.

27. The portable computer as recited in claim 20, further comprising a keyboard, wherein the drawer is disposed under the keyboard.

28. A portable computer comprising:

a housing having a plurality of surfaces that protect at least a processor and system bus within the housing; and a retractable sound producing device having at least two positions, a first position substantially within the housing in a speaker cavity, and a second position being at least partially exterior to the housing to project sound in a desired direction without having to move the housing;

a positioning means for moving the sound producing device between the first position and the second position; and a rotatable coupling device adapted for rotating the sound producing device about a first axis of rotation in the second position.

* * * * *